United States Patent
Kolb et al.

(10) Patent No.: US 8,378,048 B2
(45) Date of Patent: Feb. 19, 2013

(54) COPOLYMERS, COMPOSITIONS THEREOF, AND METHODS FOR MAKING THEM

(75) Inventors: Rainer Kolb, Kingwood, TX (US); Jo Ann Marie Canich, Houston, TX (US); Liehpao Oscar Farng, Lawrenceville, NJ (US); Sudhin Datta, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 86 days.

(21) Appl. No.: 13/004,703

(22) Filed: Jan. 11, 2011

(65) Prior Publication Data

US 2011/0184134 A1 Jul. 28, 2011

Related U.S. Application Data

(60) Provisional application No. 61/298,816, filed on Jan. 27, 2010.

(51) Int. Cl.
*C08F 210/06* (2006.01)
*C08F 210/02* (2006.01)

(52) U.S. Cl. ........ 526/348; 526/351; 526/160; 526/170; 526/943; 526/941

(58) Field of Classification Search .................. 526/348, 526/351, 170, 160, 943
See application file for complete search history.

(56) References Cited

U.S. PATENT DOCUMENTS

| | | | |
|---|---|---|---|
| 5,621,126 A | 4/1997 | Canich et al. | |
| 7,399,737 B2 * | 7/2008 | Hazelton et al. | 508/591 |
| 2006/0281647 A1 | 12/2006 | Hazelton et al. | |
| 2010/0273692 A1 * | 10/2010 | Kolb et al. | 508/591 |

FOREIGN PATENT DOCUMENTS

| | | |
|---|---|---|
| EP | 1 561 798 | 8/2005 |
| EP | 1 178 102 | 2/2006 |

* cited by examiner

*Primary Examiner* — Rip A. Lee

(57) ABSTRACT

Provided are amorphous ethylene propylene copolymer, compositions thereof, and methods for making same, whereby the copolymer can include of from about 40 wt. % to about 60 wt. % ethylene derived units; and of from about 60 wt. % to about 40 wt. % propylene derived units. The copolymer can be characterized by having no discernable melting point as measured by DSC, an MFRR (MI (21.6 kg; 230° C.)/MI (2.16 kg; 230° C.)) (MI (2.16 kg; 230° C.)) of about 38 or more, a molecular weight distribution (MWD) of from about 1.5 to about 2.5, and a shear viscosity $\eta^*$ at 0.01 rad/sec measured at 70° C. that satisfies the relation $|\eta^*|_{(70° C.;\ 0.01\ rad/sec)} > 1.2 * 10^6 * |MFR|^{-0.77}$, wherein MFR is the melt flow rate.

20 Claims, No Drawings

US 8,378,048 B2

COPOLYMERS, COMPOSITIONS THEREOF, AND METHODS FOR MAKING THEM

PRIORITY CLAIM

This application claims priority to and the benefit of U.S. Ser. No. 61/298,816, filed Jan. 27, 2010, the disclosure of which is incorporated herein by reference in its entirety.

FIELD OF THE INVENTION

Embodiments described generally relate to ethylene-propylene copolymers, lubricating oil compositions containing the same, and methods for making them. More particularly, embodiments described relate to rheology modifiers containing amorphous ethylene-propylene copolymers and lubricating oil compositions containing the same.

BACKGROUND OF THE INVENTION

Many natural and synthetic compositions may benefit from additives that modify rheology. For example, lubricant oil formulations generally contain viscosity index improvers derived from polyolefins that modify rheological behavior. There have been many attempts to develop polyolefin additives that have a high thickening efficiency without raising the average ethylene content or the propensity to chain scission under shear.

Many conventional polyolefin additives, however, suffer from unfavorable characteristics such as: (a) a high molecular weight fraction such that they are more affected by shear induced degradation of the molecular weight—such compositions have an unfavorable thickening efficiency (TE)/shear stability index (SSI) ratio in that they have a lower thickening efficiency for a given SSI; (b) preparation with conventional catalysts, which contain both a broad polydispersity index and a broad compositional distribution. Blends of amorphous and semi crystalline polyolefins have a significant and predetermined broadening of the polydispersity index and intermolecular compositional heterogeneity.

It would be desirable to produce polyolefin additives that have very little crystallinity or are completely amorphous to minimize interactions with wax molecules in the base oils. Such polymers, however, have low bulk viscosities and are tacky and extremely difficult to handle in typical finishing operations.

Accordingly, there remains a need for viscosity index improving compositions that promote the following in lubricant oils, while having a low ethylene content and maintaining adequate pellet handling characteristics: (a) a more constant viscosity over a broad range of temperatures; (b) improved thickening efficiency; and (c) improved ratio of the thickening efficiency to the SSI.

SUMMARY OF THE INVENTION

An amorphous ethylene propylene copolymer and method for making same are provided. In at least one specific embodiment, the copolymer can include of from about 40 wt. % to about 60 wt. % ethylene derived units; and of from about 60 wt. % to about 40 wt. % propylene derived units. The copolymer can be characterized by having no discernable melting point as measured by DSC, an MFRR (MI (21.6 kg; 230° C.)/(MI (2.16 kg; 230° C.)) of about 38 or more, a molecular weight distribution (MWD) of from about 1.5 to about 2.5, and a shear viscosity $\eta^*$ at 0.01 rad/sec measured at 70° C. that satisfies the relation $|\eta^*|_{(70° C.; 0.01\ rad/sec)} > 1.2*10^{6}*|MFR|^{-0.77}$, wherein MFR is the melt flow rate.

In at least one specific embodiment, the method comprises: reacting ethylene and propylene in the presence of dimethylsilylene (tetramethyl cyclopentadienyl) (cyclododecylamido) titanium dimethyl or di(p-triethylsilylphenyl) methylene [(cyclopentadienyl) (2,7-di-tert-butylfluoren-9-yl)] hafnium dimethyl at conditions sufficient to produce an amorphous copolymer comprising of from about 40 wt. % to about 60 wt. % ethylene derived units and from about 60 wt. % to about 40 wt. % propylene derived units and is characterized by having no discernable melting point as measured by DSC, an MFRR (MI (21.6 kg; 230° C.)/MI (2.16 kg; 230° C.)) of about 38 or more, a molecular weight distribution (MWD) of from about 1.5 to about 2.5, and a shear viscosity $\eta^*$ at 0.01 rad/sec measured at 70° C. that satisfies the relation $|\eta^*|_{(70° C.;\ 0.01\ rad/sec)} > 1.2*10^{6}*|MFR|^{-0.77}$, wherein MFR is the melt flow rate.

An oil composition and method for making same are also provided. In at least one specific embodiment, the oil composition includes a base oil and an amorphous ethylene propylene copolymer comprising of from about 40 wt. % to about 60 wt. % ethylene derived units, and of from about 60 wt. % to about 40 wt. % propylene derived units, wherein the copolymer is characterized by having no discernable melting point as measured by DSC, an MFRR (MI (21.6 kg; 230° C.)/MI (2.16 kg; 230° C.)) of about 38 or more, a molecular weight distribution (MWD) of from about 1.5 to about 2.5, and a shear viscosity $\eta^*$ at 0.01 rad/sec measured at 70° C. that satisfies the relation $|\eta^*|_{(70° C.;\ 0.01\ rad/sec)} > 1.2*10^{6}*|MFR|^{0.77}$, wherein MFR is the melt flow rate, wherein the amorphous ethylene propylene copolymer is present in an amount sufficient to provide an oil composition having a thickening efficiency of about 1.7 to about 2.2; and a SSI of about 15% to about 35%.

DETAILED DESCRIPTION

According to one or more embodiments provided, the ethylene-propylene copolymer is substantially, or completely amorphous. As used herein, the term "substantially amorphous" means less than about 2.0 wt. % crystallinity; whereas, "completely amorphous" means no discernable melting point as measured by DSC. Accordingly, the ethylene-propylene copolymer can have a crystallinity of less than about 2.0 wt. %, less than 1.5 wt. %, less than about 1.0 wt. %, less than about 0.5 wt. %, or less than 0.1 wt. % crystallinity, the ethylene-propylene copolymer can have no discernable melting point as measured by DSC.

The ethylene-propylene copolymer can have of from about 35 wt. % to about 75 wt. % ethylene derived units. The ethylene-propylene copolymer can also have of from about 40 wt. % to about 70 wt. % ethylene derived units. In some embodiments, the ethylene content can range from a low of about 35 wt. %, 40 wt. %, or 42 wt. % to a high of about 50 wt. %, 60 wt. %, or 70 wt. %.

The ethylene-propylene copolymer can have of from about 15 wt. % to about 65 wt. % propylene derived units. The ethylene-propylene copolymer can also have of from about 30 wt. % to about 60 wt. % propylene derived units. In some embodiments, the propylene content can range from a low of about 30 wt. %, 40 wt. %, or 50 wt. % to a high of about 40 wt. %, 50 wt. %, or 65 wt. %.

In one or more embodiments, the ethylene-propylene copolymer can include up to 20 wt. % of one or more other comonomers. Suitable comonomers include α-olefins having of from 4 to 20 carbon atoms. Suitable α-olefin comonomers can be linear or branched, and two or more α-olefin comonomers can be used, if desired. For example, suitable α-olefin comonomers can include any one or more linear $C_4$-$C_{12}$ α-olefins, and α-olefins having one or more $C_1$-$C_3$ alkyl branches. Specific examples include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene, or 1-dodecene. Preferred comonomers include 1-butene, 1-pentene, 3-methyl-1-butene, 1-hexene, 3-methyl-1-pentene, 4-methyl-1-pentene, 3,3-dimethyl-1-butene, 1-heptene, 1-hexene with a methyl substituents on any of C3-C5, 1-pentene with two methyl substituents in any stoichiometrically acceptable combination on C3 or C4, 3-ethyl-1-pentene, 1-octene, 1-pentene with a methyl substituents on any of C3 or C4, 1-hexene with two methyl substituents in any stoichiometrically acceptable combination on C3-C5, 1-pentene with three methyl substituents in any stoichiometrically acceptable combination on C3 or C4, 1-hexene with an ethyl substituents on C3 or C4, 1-pentene with an ethyl substituents on C3 and a methyl substituents in a stoichiometrically acceptable position on C3 or C4, 1-decene, 1-nonene, 1-nonene with a methyl substituents on any of C3-C8, 1-octene with two methyl substituents in any stoichiometrically acceptable combination on C3-C7, 1-heptene with three methyl substituents in any stoichiometrically acceptable combination on C3-C6, 1-octene with an ethyl substituents on any of C3-C7, 1-hexene with two ethyl substituents in any stoichiometrically acceptable combination on C3 or C4, and 1-dodecene. Other suitable comonomers include internal olefins, such as cis 2-butene and trans 2-butene.

Other suitable comonomers include one or more polyenes. The term "polyene" as used herein is meant to include monomers having two or more unsaturations; i.e., dienes, trienes, etc. Polyenes particularly useful as co-monomers are non-conjugated dienes, preferably are straight chain, hydrocarbon di-olefins or cycloalkenyl-substituted alkenes, having about 6 to about 15 carbon atoms, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6 single ring alicyclic dienes, such as 1,4-cyclohexadiene; 1,5-cyclo-octadiene and 1,7-cyclododecadiene; (c) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (d) cycloalkenyl-substituted alkenes, such as vinyl cyclohexene, allyl cyclohexene, vinyl cyclooctene, 4-vinyl cyclohexene, allyl cyclodecene; and vinyl cyclododecene. Of the non-conjugated dienes typically used, the preferred dienes are dicyclopentadiene (DCPD), 1,4-hexadiene, 1,6-octadiene; 5-methyl-1,4-hexadiene; 3,7-dimethyl-1,6-octadiene; 5-methylene-2-norbornene, 5-ethylidene-2-norbornene (ENB), and tetracyclo (Δ-11,12) 5,8 dodecene. Note that throughout this application the terms "polyene", "non-conjugated diene" and "diene" are used interchangeably. It is preferred to use dienes which do not lead to the formation of long chain branches. For successful use as VI improver non- or lowly branched polymer chains are preferred. Other polyenes that can be used include cyclopentadiene and octatetra-ene.

Physical Properties

In one or more embodiments, the copolymer can have a melt flow rate ("MFR") as measured by ASTM 1238D (230° C., 2.16 kg) of from about 3 to about 25 g/10 min. The MFR can also be from about 3 to about 20 g/10 min, from about 5 to about 15 g/10 min, or from about 6 to about 12 g/10 min.

In one or more embodiments, the copolymer can have a high load melt flow rate ("HLMFR") as measured by ASTM 1238D (230° C., 21.6 kg) of from about 50 to about 1000 g/10 min. The HLMFR can also be from about 100 to about 800 g/10 min, from about 100 to about 600 g/10 min, or from about 100 to about 500 g/10 min. In one or more embodiments, the HLMFR is from about 100 to about 1000 g/10 min; or from about 200 to about 600 g/10 min.

In one or more embodiments, the copolymer can have a ratio of the melt flow rate at 21.6 kg; 230° C. to the melt flow rate at 2.16 kg; 230° C. (MFRR) of about 30 or more. Preferably, the MFRR is more than 35, more than 40 or more than 42. In one or more embodiments, the copolymer can have a ratio of the melt flow rate at 21.6 kg; 230° C. to the melt flow rate at 2.16 kg; 230° C. (MFRR) of about 200 or less. Preferably, the MFRR is less than 100, less than 80 or less than 60. In one or more embodiments, the MFRR can range from a low of about 25, 30, or 35 to a high of about 45, 70, or 85. In one or more embodiments, the MFRR can range from a low of about 22, 32, or 42 to a high of about 52, 62, or 72.

In one or more embodiments, the copolymer can have a weight-average molecular weight (Mw) in terms of polystyrene, as measured by GPC, in the range of about 30,000 to about 800,000. More preferably, the weight average Mw is from about 40,000 to about 600,000 or from about 70,000 to about 300,000. Even more preferably, the weight average Mw is from about 70,000 to about 200,000.

In one or more embodiments, the copolymer can have a number-average molecular weight (Mn), as measured by GPC, of from about 10,000 to about 400,000, or in the range of about 20,000 to about 300,000, or in the range of about 35,000 to about 200,000.

In one or more embodiments, the copolymer can have a Mw/Mn ("MWD") of about 5.0 or less, or about 4.0 or less, or 3.0 or less, or 2.2 or less, as measured by GPC. In one or more embodiments, the Mw/Mn is from less than 2.8, or less than 2.6, or less than 2.4, or less than 2.3, or less than 2.2. In one or more embodiments, the Mw/Mn is of from about 1.0 to about 3.0; of from about 1.5 to about 2.5; of from about 2.0 to about 2.4; or of from about 2.1 to about 2.3.

Mz, Mw, and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyrogel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Average molecular weights M can be computed from known expressions. The desired MWD function (e.g., Mw/Mn or Mz/Mw) is the ratio of the corresponding M values. Measurement of M and MWD is well known in the art and is discussed in more detail in, for example, Slade, P. E.

Ed., Polymer Molecular Weights Part II, Marcel Dekker, Inc., NY, (1975), pp. 287-368; Rodriguez, F., Principles of Polymer Systems 3rd ed., Hemisphere Pub. Corp., NY, (1989), pp. 155-160; U.S. Pat. No. 4,540,753; Ver Strate et al., Macromolecules, Vol. 21, (1988), pp. 3360-3372.

In one or more embodiments, the copolymer can have a shear viscosity $\eta^*$ at 0.01 rad/sec measured at 70° C. that satisfies the relation $|\eta^*|_{(70° C.; 0.01 \, rad/sec)} > 1.2*10^6*|MFR|^{-0.77}$, wherein MFR is the melt flow rate. In one or more embodiments, the copolymer can have a shear viscosity $\eta^*$ at 0.01 rad/sec measured at 70° C. that satisfies the relation $|\eta^*|_{(70° C.; 0.01 \, rad/sec)} > 1.6*10^6*|MFR|^{-0.77}$, wherein MFR is the melt flow rate. In one or more embodiments, the copolymer can have a shear viscosity $\eta^*$ at 0.01 rad/sec measured at 70° C. that satisfies the relation $|\eta^*|_{(70° C.; 0.01 \, rad/sec)} > 1.8*10^6*|MFR|^{-0.77}$, wherein MFR is the melt flow rate.

In one or more embodiments, the copolymer can have a heat of fusion on a first melt of from about 0 to about 60 J/g, or from about 0 to about 50 J/g, or from about 0 to about 40 J/g, or from about 0 to about 35 J/g, or less than about 30 J/g, or less than about 20 J/g, or less than about 15 J/g. In a preferred embodiment, the copolymer is substantially amorphous and can have no measurable heat of fusion.

Catalyst

Although any conventional catalyst capable of producing long chain branching may be used to prepare ethylene-propylene copolymers, preferably polymerization takes place in the presence of a metallocene catalyst. The terms "metallocene," "metallocene precatalysts," and "metallocene catalyst precursor" as used herein refer to compounds possessing a transition metal M, with at least one cyclopentadienyl (Cp) ligand, at least one non-cyclopentadienyl-derived ligand X, and zero or one heteroatom-containing ligand $(YR^2_r)$, the ligands being coordinated to M and corresponding in number to the valence thereof. The metallocene catalyst precursors are generally neutral complexes but when activated with a suitable co-catalyst yield an active metallocene catalyst which refers generally to an organometallic complex with a vacant coordination site that can coordinate, insert, and polymerize olefins. The metallocene catalyst precursor is preferably one of, or a mixture of, metallocene compounds of either or both of the following types: (1) cyclopentadienyl (Cp) complexes which have two Cp ring systems for ligands (also referred to as a bis-Cp or bis-Cp complex), and (2) monocyclopentadienyl complexes which have only one Cp ring system as a ligand (also referred to as a mono-Cp or mono-Cp complex).

Cyclopentadienyl (Cp) complexes of the first type, i.e., type 1, have two Cp ring systems for ligands that form a sandwich complex with the metal and can be free to rotate (unbridged) or can be locked into a rigid configuration through a bridging group. The Cp ring ligands can be like or unlike, unsubstituted, substituted, or a derivative thereof such as a heterocyclic ring system which may be substituted, and the substitutions can be fused to form other saturated or unsaturated rings systems such as tetrahydroindenyl, indenyl, cyclopentanaphthyl or fluorenyl ring systems. These Cp complexes have the general formula:

$$(Cp^1R^1_m)R^3_n(Cp^2R^2_p)MX_q \quad (1)$$

wherein $Cp^1$ of ligand $(Cp^1R^1_m)$ and $Cp^2$ of ligand $(Cp^2R^2_p)$ are Cp rings, each $R^1$ and $R^2$ is, independently, a halogen or a hydrocarbyl, substituted hydrocarbyl, halocarbyl, or substituted halocarbyl group containing up to about 20 carbon atoms, m is 0 to 5, p is 0 to 5, and any two $R^1$ and/or $R^2$ substituents on adjacent carbon atoms of the Cp ring associated there with can be joined together to form a ring containing from 4 to about 20 carbon atoms, $R^3$ is a bridging group that optionally bridges the $(Cp^1R^1_m)$ and $(Cp^2R^2_p)$ ligands, n is the number of atoms in the direct chain between the two ligands and is an integer from 0 to 8, preferably 1 to 3 (where 0 indicates the absence of the bridging group), M is a transition metal having a valence of from 3 to 6, preferably from group 4, 5, or 6 of the periodic table of the elements and is preferably in its highest oxidation state, each X is a non-cyclopentadienyl ligand and is, independently, a halogen or a hydride, or a hydrocarbyl, substituted hydrocarbyl, halocarbyl, or substituted halocarbyl group containing up to about 20 carbon atoms, q is equal to the valence of M minus 2.

The mono-Cp complex of the second type that has only one Cp ring system, i.e., type 2, forms a half-sandwich complex with the metal and can be free to rotate (unbridged) or locked into a rigid configuration through a bridging group to a heteroatom-containing ligand. The Cp ring ligand can be unsubstituted, substituted, or a derivative thereof such as a heterocyclic ring system which may be substituted, and the substitutions can be fused to form other saturated or unsaturated rings systems such as tetrahydroindenyl, indenyl, cyclopentanaphthyl or fluorenyl ring systems. The heteroatom containing ligand is bound to both the metal and optionally to the Cp ligand through the bridging group. The heteroatom itself is an atom with a coordination number of three from group 15 or a coordination number of two from group 16 of the periodic table of the elements. These mono-Cp complexes have the general formula:

$$(Cp^1R^1_m)R^3_n(YR^2_r)MX_sL_t \quad (2)$$

wherein $Cp^1$ of the ligand $(Cp^1R^1_m)$ and is a Cp ring, $R^1$ is independently, a halogen, or a hydrocarbyl, substituted hydrocarbyl, halocarbyl, or substituted halocarbyl group containing up to about 20 carbon atoms, "m" is 0 to 5, and any two $R^1$ substituents on adjacent carbon atoms of the Cp ring associated there with can be joined together to form a ring containing from 4 to about 20 carbon atoms, $R^3$ is a bridging group that optionally bridges the $(Cp^1R^1_m)$ and $(YR^2_r)$ ligands, "n" is the number of atoms in the direct chain between the two ligands and is an integer from 0 to 8, preferably 1 to 3 (where 0 indicates the absence of the bridging group), M is a transition metal having a valence of from 3 to 6, preferably from group 4, 5, or 6 of the periodic table of the elements and is preferably in its highest oxidation state, Y is a heteroatom in which the heteroatom is an element with a coordination number of three from Group 15 or a coordination number of two from group 16 preferably nitrogen, phosphorous, oxygen, or sulfur, r is 1 when Y has a coordination number of three and n is not 0 or when Y has a coordination number of two and n is 0, r is 2 when Y has a coordination number of three and n is 0, or r is 0 (meaning $R^2$ is absent) when Y has a coordination number of two and n is not 0, $R^2$ is a radical selected from $C_1$ to $C_{20}$ hydrocarbyl, substituted hydrocarbyl, halocarbyl, or substituted halocarbyl groups, and each X is a non-cyclopentadienyl ligand and is, independently, a halogen, a hydride, or a hydrocarbyl, substituted hydrocarbyl, halocarbyl, or substituted halocarbyl group containing up to about 20 carbon atoms, "s" is equal to the valence of M minus 2, L is independently, an olefin, diolefin, aryne, amine, phosphine, ether, sulfide ligand, or any other neutral Lewis base and t represents the number of L bonded to M where t is 0, 1, or 2, and optionally any L and any X may be bonded to one another.

A preferred choice of cyclopentadienyl (Cp) complexes of the first type, i.e., type 1, are the bis-Cp metallocene complexes of formula (3):

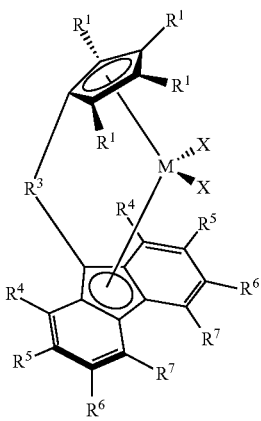

(3)

wherein M is a group 4 transition metal selected from Ti, Zr and Hf, each $R^1$, $R^4$, $R^5$, $R^6$ and $R^7$ is independently, a hydrogen, halogen, or a hydrocarbyl, substituted hydrocarbyl, halocarbyl, or substituted halocarbyl group containing up to about 20 carbon atoms, and optionally any two adjacent $R^1$, $R^4$, $R^5$, $R^6$, or $R^7$ may be linked together to form a ring containing from 4 to about 20 carbon atoms, $R^3$ is a bridging group containing a group 13, 14, 15 or 16 element, and X is a non-cyclopentadienyl ligand and is, independently, a halogen, a hydride, or a hydrocarbyl, substituted hydrocarbyl, halocarbyl, or substituted halocarbyl group containing up to about 20 carbon atoms, and optionally, the both X may be linked together.

Another preferred choice of cyclopentadienyl (Cp) complexes of the first type, i.e., type 1, are the bis-Cp metallocene complexes of formula (3) wherein M is zirconium or hafnium, $R^1$, $R^4$, $R^5$, $R^6$ and $R^7$ are each independently selected from hydride, methyl, ethyl, and all isomers of propyl, butyl, pentyl, hexyl, heptyl, octyl, nonyl, decyl, undecyl, dodecyl, $R^3$ is selected from dimethylsilylene, diphenylsilylene, methylphenylsilylene, cyclotetramethylenesilylene, cyclopentamethylenesilylene, methylene, 1,2-ethylene, 1,3-propylene, 1,1-dimethylmethylene, 1,1-diphenylmethylene, di(p-triethylsilylphenyl)methylene, X is independently selected from chloro, fluoro, bromo, hydride, methyl, benzyl, dimethylamide, diethylamide, or both X together may be butadiene, or any isomer of pentadiene or hexadiene.

The most preferred choice of cyclopentadienyl (Cp) complexes of the first type, i.e., type 1, are the bis-Cp metallocene complexes of formula (3) wherein M is hafnium, $R^1$, $R^4$, $R^5$, $R^6$ and $R^7$ are each independently selected from hydride, methyl, ethyl and all isomers of propyl, and butyl, and more preferably each $R^1$, $R^4$, $R^6$ and $R^7$ are hydride and each $R^5$ is tert-butyl, $R^3$ is selected from 1,1-dimethylmethylene, 1,1-diphenylmethylene and di(p-triethylsilylphenyl)methylene, each X is methyl, or both X together is butadiene, or any isomer of pentadiene or hexadiene.

In a preferred embodiment, the cyclopentadienyl (Cp) complexes of the first type, i.e., type 1, is a di(p-triethylsilylphenyl)methylene[(cyclopentadienyl) (2,7-di-tert-butylfluoren-9-yl)]hafnium dimethyl. Examples of other suitable bis-Cp metallocenes of the type described in type 1 above are disclosed in U.S. Pat. No. 5,324,800; U.S. Pat. No. 5,198,401; U.S. Pat. No. 5,278,119; U.S. Pat. No. 5,387,568; U.S. Pat. No. 5,120,867; U.S. Pat. No. 5,017,714; U.S. Pat. No. 4,871,705; U.S. Pat. No. 4,542,199; U.S. Pat. No. 4,752,597; U.S. Pat. No. 5,132,262; U.S. Pat. No. 5,391,629; U.S. Pat. No. 5,243,001; U.S. Pat. No. 5,278,264; U.S. Pat. No. 5,296,434; and U.S. Pat. No. 5,304,614.

A preferred choice of mono-Cp complexes which have only one Cp ring system, i.e., type 2, is the mono-Cp transition metal component of formula (4), where M is a group 4 transition metal selected from Ti, Zr and Hf, $R^1$ is independently, a hydrogen, halogen, or a hydrocarbyl, halocarbyl, hydrocarbyl-substituted organometalloid or halocarbyl-substituted organometalloid group containing up to about 20 carbon atoms, and optionally any two adjacent $R^1$ may be linked together to form a ring containing from 4 to about 20 carbon atoms, $R^3$ is a bridging group containing a group 13, 14, 15 or 16 element, Y is a group 15 heteroatom, $R^2$ is a radical selected from a group consisting of $C_1$ to $C_{20}$ hydrocarbyl radicals, substituted $C_1$ to $C_{20}$ hydrocarbyl radicals, wherein one or more hydrogen atoms is replaced with a halogen atom, and X is a non-cyclopentadienyl ligand and is, independently, a halogen, a hydride, or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, and optionally, the X's may be linked together.

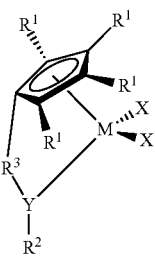

(4)

Another preferred choice of mono-Cp complexes which have only one Cp ring system, i.e., type 2, is the mono-Cp transition metal component of formula (4) wherein M is titanium, Y is nitrogen, $R^1$ is independently selected from hydrogen, methyl, or ethyl, and all isomers of propyl and butyl, $R^2$ is selected from methyl, ethyl, phenyl, benzyl and all isomers of propyl, butyl, pentyl, hexyl, heptyl, octyl, nonyl, decyl, undecyl, dodecyl, adamantyl, norbornyl, methylphenyl, dimethylphenyl, ethylphenyl, diethylphenyl, propylphenyl and dipropylphenyl, $R^3$ is selected from dimethylsilylene, diphenylsilylene, methylphenylsilylene, cyclotetramethylenesilylene, cyclopentamethylenesilylene, methylene, 1,2-ethylene, 1,3-propylene, 1,1-dimethylmethylene, 1,1-diphenylmethylene, X is independently selected from chloro, fluoro, bromo, hydride, methyl, benzyl, dimethylamide, diethylamide, or both X together may be butadiene, or any isomer of pentadiene or hexadiene.

The most preferred choice of mono-Cp complexes which have only one Cp ring system, i.e., type 2, is the mono-Cp transition metal component of formula (4) wherein M is titanium, Y is nitrogen, $R^1$ is methyl, $R^2$ is selected from tert-butyl, 1-adamantyl, cyclohexyl, cyclooctyl, cyclodecyl, cyclododecyl and benzyl, $R^3$ is dimethylsilylene, each X is methyl or both X together is butadiene, or any isomer of pentadiene or hexadiene.

Examples of suitable mono-Cp complexes of the type described in type 2 above are disclosed in U.S. Pat. No. 5,026,798; U.S. Pat. No. 5,055,438; U.S. Pat. No. 5,096,867; U.S. Pat. No. 5,264,405; RE37,788; RE37,400; U.S. Pat. No.

5,955,625; U.S. Pat. No. 6,265,338; U.S. Pat. No. 6,638,887; U.S. Pat. No. 7,163,907; and U.S. Pat. No. 7,569,646.

In a preferred embodiment, the choice of mono-Cp complexes which have only one Cp ring system, i.e., type 2, is dimethylsilylene(tetramethylcyclopentadienyl) (cyclododecylamido)titanium dimethyl.

In one or more embodiments, copolymerization techniques can utilize more than one catalyst, i.e., two or more bis-Cp catalysts, or two or more mono-Cp catalysts, or one or more bis-Cp catalysts with one or more mono-Cp catalysts.

Activators

The catalyst precursors employed in the present process can also be activated with cocatalysts or activators that comprise non-coordinating anions or they can be activated with Lewis acid activators, or a combination thereof.

Ionic activators comprise non-coordinating anions. The term "noncoordinating anion" (NCA) means an anion which either does not coordinate to said transition metal cation or which is only weakly coordinated to said cation thereby remaining sufficiently labile to be displaced by a neutral Lewis base. "Compatible" NCA's are those which are not degraded to neutrality when the initially formed complex decomposes. Further, the anion will not transfer an anionic substituents or fragment to the cation so as to cause it to form a neutral four coordinate metallocene compound and a neutral by-product from the anion. NCA's useful in for the purposes herein are those which are compatible, stabilize the metallocene cation in the sense of balancing its ionic charge in a +1 state, and yet retain sufficient lability to permit displacement by an ethylenically or acetylenically unsaturated monomer during polymerization. Additionally, the anions useful for the purposes herein will be large or bulky in the sense of sufficient molecular size to largely inhibit or prevent neutralization of the metallocene cation by Lewis bases other than the polymerizable monomers that may be present in the polymerization process. Typically the anion will have a molecular size of greater than or equal to about 4 angstroms. NCA's are preferred because of their ability to produce a target molecular weight polymer at a higher temperature than tends to be the case with other activation systems such as alumoxane.

Descriptions of ionic catalysts for coordination polymerization using metallocene cations activated by non-coordinating anions appear in EP-A-0 277 003, EP-A-0 277 004, WO92/00333, U.S. Pat. No. 5,198,401, and U.S. Pat. No. 5,278,119. These references teach a preferred method of preparation wherein metallocenes (bis-Cp and mono-Cp) are protonated by an anionic precursors such that an alkyl/hydride group is abstracted from a transition metal to make it both cationic and charge-balanced by the non-coordinating anion. The use of ionizing ionic compounds not containing an active proton but capable of producing both the active metallocene cation and a noncoordinating anion are also known. See, e.g., EP-A-0 426 637, EP-A-0 573 403, and U.S. Pat. No. 5,387,568. Reactive cations other than Bronsted acids capable of ionizing the metallocene compounds include ferrocenium triphenylcarbonium and triethylsilylinium cations.

Any metal or metalloid capable of forming a coordination complex which is resistant to degradation by water (or other Bronsted or Lewis Acids) may be used or contained in the anion of the second activator compound. Suitable metals include, but are not limited to, aluminum, gold, platinum and the like. Suitable metalloids include, but are not limited to, boron, phosphorus, silicon and the like.

An additional method of making the ionic catalysts uses ionizing anionic pre-cursors (Lewis acid activators) which are initially neutral Lewis acids but form the cation and anion upon ionizing reaction with the metallocene compounds, for example, tris(pentafluorophenyl) boron acts to abstract an alkyl, hydride or silyl ligand to yield a metallocene cation and stabilizing non-coordinating anion, see, e.g., EP-A-0 427 697 and EP-A-0 520 732. Ionic catalysts for addition polymerization can also be prepared by oxidation of the metal centers of transition metal compounds by anionic precursors containing metallic oxidizing groups along with the anion groups, see EP-A-0 495 375.

Where the metal ligands include halide moieties, for example, [dimethysilylene(tetramethylcyclopentadienyl) (tert-butylamido) zirconium dichloride], which are not capable of ionizing abstraction under standard conditions, they can be converted via known alkylation reactions with organometallic compounds such as lithium or aluminum hydrides or alkyls, alkylalumoxanes, Grignard reagents, etc. Processes describing the reaction of alkyl aluminum compounds with dihalide substituted metallocene compounds prior to or with the addition of activating anionic compounds are found in EP-A-0 500 944, EP-A1-0 570 982, and EP-A1-0 612 768. For example, an aluminum alkyl compound may be mixed with the metallocene prior to its introduction into the reaction vessel. Since the alkyl aluminum is also suitable as a scavenger its use in excess of that normally stoichiometrically required for alkylation of the metallocene will permit its addition to the reaction solvent with the metallocene compound. Normally, alumoxane would not be added with the metallocene so as to avoid premature activation, but can be added directly to the reaction vessel in the presence of the polymerizable monomers when serving as both scavenger and alkylating activator. Alumoxanes may also fulfill a scavenging function.

Similarly, a co-activator is a compound capable of alkylating the transition metal complex, such that when used in combination with an activator, an active catalyst is formed. Co-activators include alumoxanes such as methyl alumoxane, modified alumoxanes such as modified methyl alumoxane, and aluminum alkyls such trimethyl aluminum, tri-isobutyl aluminum, triethyl aluminum, and tri-isopropyl aluminum. Co-activators are typically used in combination with Lewis acid activators and ionic activators when the precatalyst is not a dihydrocarbyl or dihydride complex.

Known alkylalumoxanes are additionally suitable as catalyst activators, particularly for those metallocenes comprising halide ligands. The alumoxane component useful as catalyst activator typically is an oligomeric aluminum compound represented by the general formula $(R—Al—O)_n$, which is a cyclic compound, or $R(R—Al—O)_n AlR_2$, which is a linear compound. In the general alumoxane formula R is a $C_1$ to $C_5$ alkyl radical, for example, methyl, ethyl, propyl, butyl or pentyl and "n" is an integer from 1 to about 50. Most preferably, R is methyl and "n" is at least 4, i.e., methylalumoxane (MAO). Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

Illustrative, but not limiting examples of boron compounds which may be used as an activator include tri-substituted ammonium salts such as trimethylammonium tetraphenylborate, triethylammonium tetraphenylborate, tripropylammonium tetraphenylborate, tri(n-butyl)ammonium tetraphenylborate, tri(tert-butyl)ammonium tetraphenylborate, N,N-dimethylanilinium tetraphenylborate, N,N-diethylanilinium tetraphenylborate, N,N-dimethyl-(2,4,6-trimethylanilinium) tetraphenylborate, trimethylammonium tetrakis(pentafluorophenyl)borate.

Preferably, the activator is N,N-dimethylanilinium tetrakis(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetra(perfluorophenyl)borate, trisperfluorophenyl boron or trisperfluoronaphthyl boron.

When a Lewis acid activator (excluding alumoxanes) or an ionic activator is used, the catalyst-precursor-to-activator molar ratio is from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2. The catalyst-precursor-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1, 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

Preferred activators and activator/co-activator combinations include methylalumoxane, modified methylalumoxane, mixtures of methylalumoxane with dimethylanilinium tetrakis(pentafluorophenyl)borate, dimethylanilinium tetrakis(pentafluoronaphthyl)borate or tris(pentafluorophenyl)boron, and mixtures of trimethyl aluminum or triisobutyl aluminum with dimethylanilinium tetrakis(pentafluorophenyl)borate, dimethylanilinium tetrakis(pentafluoronaphthyl)borate or tris(pentafluorophenyl)boron.

In some embodiments, scavenging compounds are used with Lewis acid activators or ionic activators. Typical aluminum or boron alkyl components useful as scavengers are represented by the general formula $R_xJZ_2$ where J is aluminum or boron, $R_x$ is a $C_1$-$C_{20}$ alkyl radical, for example, methyl, ethyl, propyl, butyl, pentyl, hexyl, heptyl, octyl and isomers thereof, and each Z is independently $R_x$ or a different univalent anionic ligand such as halogen (Cl, Br, I), alkoxide ($OR_x$) and the like. Most preferred aluminum alkyls include triethylaluminum, diethylaluminum chloride, tri-iso-butylaluminum, tri-n-octylaluminum, tri-n-hexylaluminum, trimethylaluminum and the like. Preferred boron alkyls include triethylboron. Scavenging compounds may also be alumoxanes and modified alumoxanes including methylalumoxane and modified methylalumoxane.

Polymerization Process

The copolymer can be polymerized in a single, well stirred tank reactor in solution where the viscosity of the solution during polymerization is less than 10000 cps, or less than 7000 cps, and preferably less than 500 cps. The reactor is preferably liquid filled, continuous flow, stirred tank reactor providing full back mixing for random copolymer production. Solvent, monomers, and catalyst are fed to the reactor. When two or more reactors are utilized, solvent, monomers, and/or catalyst is fed to the first reactor or to one or more additional reactors.

Reactors may be cooled by reactor jackets or cooling coils, autorefrigeration, prechilled feeds or combinations of all three to absorb the heat of the exothermic polymerization reaction. Autorefrigerated reactor cooling requires the presence of a vapor phase in the reactor. Adiabatic reactors with prechilled feeds are preferred in which the polymerization exotherm is absorbed by permitting a temperature rise of the polymerizing liquid.

Use of hydrogen to control molecular weight may be avoided or reduced, if desired. The reactor temperature may be used to control the molecular weight of the polymer fraction produced. In series operation, this gives rise to a temperature difference between reactors which is helpful for controlling polymer molecular weight.

Reactor temperature can be selected depending upon the effect of temperature on catalyst deactivation rate and polymer properties and/or extent of monomer depletion. When using more than one reactor, generally temperatures should not exceed the point at which the concentration of catalyst in the second reactor is insufficient to make the desired polymer component in the desired amount. Therefore, reaction temperature can be determined by the details of the catalyst system.

In general, a single reactor or first reactor in a series will operate at a reactor temperature from about 0° C. to about 200° C., or from about 40° C. to about 180° C., or from about 60° C. to about 180° C. Preferably, reaction temperatures are from about 80° C. to about 160° C. When using one or more additional reactors, the additional reactor temperature will vary from 40° C.-200° C., with 40° C.-180° C. preferred, and 80° C.-160° C. more preferred. Ranges from any of the recited lower limits to any of the recited upper limits are contemplated by the inventors and within the scope of the present description. In copolymerization techniques that utilize one or more bis-CP catalysts with one or more mono-CP catalysts, a lower reaction temperature is preferred for reactions utilizing mono-CP catalyst when compared to the bis-CP catalyst.

Reaction pressure is determined by the details of the catalyst system. In general reactors, whether a single reactor or each of a series of reactors, operates at a reactor pressure of less than 2500 psi (17.23 Mpa), or less than 2200 psi (15.16 Mpa) or less than 2000 psi (13.78 Mpa). Preferably, reactor pressure is from about atmospheric pressure to about 2000 psi (13.78 Mpa), or from about 200 psi (1.38 Mpa) to about 2000 psi (13.78 Mpa), or from about 300 psi (2.07 Mpa) to about 1800 psi (12.40 Mpa). Ranges from any of the recited lower limits to any of the recited upper limits are contemplated by the inventors and within the scope of the present description.

In the case of less stable catalysts, catalyst can also be fed to a second reactor when the selected process uses reactors in series. Optimal temperatures can be achieved, particularly for series operation with progressively increasing polymerization temperature, by using bis-Cp catalyst systems containing hafnium as the transition metal, especially those having a covalent, single atom bridge coupling the two Cp rings.

Particular reactor configurations and processes suitable for use in the processes described herein are described in detail in U.S. Pat. No. 6,319,998.

Branching is introduced by the choice of polymerization catalysts or process. The copolymerization process may occur with or without hydrogen present. However, operation without hydrogen is preferred because it inhibits branching in the copolymers since it lead to chain ends which are completely or substantially saturated. Without being limited by theory, it is believed that these saturated polymers cannot participate in the principal branching pathway where preformed polymers with unsaturated chain ends are reincorporated into new growing chains which lead to branched polymers.

Lubricating Oil Compositions

Lubricating oil compositions containing the ethylene-propylene copolymer and one or more base oils are also provided. The base oil can be or include natural or synthetic oils of lubricating viscosity, whether derived from hydrocracking, hydrogenation, other refining processes, unrefined processes, or re-refined processes. The base oil can be or include used oil. Natural oils include animal oils, vegetable oils, mineral oils and mixtures thereof. Synthetic oils include hydrocarbon oils, silicon-based oils, and liquid esters of phosphorus-containing acids. Synthetic oils may be produced by Fischer-Tropsch gas-to-liquid synthetic procedure as well as other gas-to-liquid oils.

In one embodiment, the base oil is or includes a polyalphaolefin (PAO) including a PAO-2, PAO-4, PAO-5, PAO-6, PAO-7 or PAO-8 (the numerical value relating to Kinematic Viscosity at 100° C.). Preferably, the polyalphaolefin is prepared from dodecene and/or decene. Generally, the polyalphaolefin suitable as an oil of lubricating viscosity has a viscosity less than that of a PAO-20 or PAO-30 oil. In one or more embodiments, the base oil can be defined as specified in the American Petroleum Institute (API) Base Oil Interchangeability Guidelines. For example, the base oil can be or include an API Group I, II, III, IV, V oil or mixtures thereof.

In one or more embodiments, the base oil can include oil or blends thereof conventionally employed as crankcase lubricating oils. For example, suitable base oils can include crankcase lubricating oils for spark-ignited and compression-ignited internal combustion engines, such as automobile and truck engines, marine and railroad diesel engines, and the like. Suitable base oils can also include those oils conventionally employed in and/or adapted for use as power transmitting fluids such as automatic transmission fluids, tractor fluids, universal tractor fluids and hydraulic fluids, heavy duty hydraulic fluids, power steering fluids and the like. Suitable base oils can also be or include gear lubricants, industrial oils, pump oils and other lubricating oils.

In one or more embodiments, the base oil can include not only hydrocarbon oils derived from petroleum, but also include synthetic lubricating oils such as esters of dibasic acids; complex esters made by esterification of monobasic acids, polyglycols, dibasic acids and alcohols; polyolefin oils, etc. Thus, the lubricating oil compositions described can be suitably incorporated into synthetic base oils such as alkyl esters of dicarboxylic acids, polyglycols and alcohols; poly-alpha-olefins; polybutenes; alkyl benzenes; organic esters of phosphoric acids; polysilicone oils; etc. The lubricating oil composition can also be utilized in a concentrate form, such as from 1 wt. % to 49 wt. % in oil, e.g., mineral lubricating oil, for ease of handling, and may be prepared in this form by carrying out the reaction of the invention in oil as previously described.

Conventional Oil Additives

The lubricating oil composition can optionally contain one or more conventional additives, such as, for example, pour point depressants, antiwear agents, antioxidants, other viscosity-index improvers, dispersants, corrosion inhibitors, anti-foaming agents, detergents, rust inhibitors, friction modifiers, and the like.

Corrosion inhibitors, also known as anti-corrosive agents, reduce the degradation of the metallic parts contacted by the lubricating oil composition. Illustrative corrosion inhibitors include phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 wt. % to 30 wt. % of a sulfide of phosphorus for ½ to 15 hours, at a temperature in the range of 66° C. to 316° C. Neutralization of the phosphosulfurized hydrocarbon may be effected in the manner taught in U.S. Pat. No. 1,969,324.

Oxidation inhibitors, or antioxidants, reduce the tendency of mineral oils to deteriorate in service, as evidenced by the products of oxidation such as sludge and varnish-like deposits on the metal surfaces, and by viscosity growth. Such oxidation inhibitors include alkaline earth metal salts of alkylphenolthioesters having $C_5$ to $C_{12}$ alkyl side chains, e.g., calcium nonylphenate sulfide, barium octylphenate sulfide, dioctylphenylamine, phenylalphanaphthylamine, phosphosulfurized or sulfurized hydrocarbons, etc. Other oxidation inhibitors or antioxidants useful in this invention include oil-soluble copper compounds, such as described in U.S. Pat. No. 5,068,047.

Friction modifiers serve to impart the proper friction characteristics to lubricating oil compositions such as automatic transmission fluids. Representative examples of suitable friction modifiers are found in U.S. Pat. No. 3,933,659, which discloses fatty acid esters and amides; U.S. Pat. No. 4,176,074, which describes molybdenum complexes of polyisobutenyl succinic anhydride-amino alkanols; U.S. Pat. No. 4,105,571, which discloses glycerol esters of dimerized fatty acids; U.S. Pat. No. 3,779,928, which discloses alkane phosphonic acid salts; U.S. Pat. No. 3,778,375, which discloses reaction products of a phosphonate with an oleamide; U.S. Pat. No. 3,852,205, which discloses S-carboxyalkylene hydrocarbyl succinimide, S-carboxyalkylene hydrocarbyl succinamic acid and mixtures thereof; U.S. Pat. No. 3,879,306, which discloses N(hydroxyalkyl)alkenyl-succinamic acids or succinimides; U.S. Pat. No. 3,932,290, which discloses reaction products of di-(lower alkyl) phosphites and epoxides; and U.S. Pat. No. 4,028,258, which discloses the alkylene oxide adduct of phosphosulfurized N-(hydroxyalkyl) alkenyl succinimides. Preferred friction modifiers are succinate esters, or metal salts thereof, of hydrocarbyl substituted succinic acids or anhydrides and thiobis-alkanols such as described in U.S. Pat. No. 4,344,853.

Dispersants maintain oil insolubles, resulting from oxidation during use, in suspension in the fluid, thus preventing sludge flocculation and precipitation or deposition on metal parts. Suitable dispersants include high molecular weight N-substituted alkenyl succinimides, the reaction product of oil-soluble polyisobutylene succinic anhydride with ethylene amines such as tetraethylene pentamine and borated salts thereof. High molecular weight esters (resulting from the esterification of olefin substituted succinic acids with mono or polyhydric aliphatic alcohols) or Mannich bases from high molecular weight alkylated phenols (resulting from the condensation of a high molecular weight alkylsubstituted phenol, an alkylene polyamine and an aldehyde such as formaldehyde) are also useful as dispersants.

Pour point depressants ("ppd"), otherwise known as lube oil flow improvers, lower the temperature at which the fluid will flow or can be poured. Any suitable pour point depressant known in the art can be used. For example, suitable pour point depressants include, but are not limited to, one or more $C_8$ to $C_{18}$ dialkylfumarate vinyl acetate copolymers, polymethyl methacrylates, alkylmethacrylates and wax naphthalene.

Foam control can be provided by any one or more anti-foamants. Suitable anti-foamants include polysiloxanes, such as silicone oils and polydimethyl siloxane.

Anti-wear agents reduce wear of metal parts. Representatives of conventional antiwear agents are zinc dialkyldithiophosphate and zinc diaryldithiosphate, which also serves as an antioxidant.

Detergents and metal rust inhibitors include the metal salts of sulphonic acids, alkyl phenols, sulfurized alkyl phenols, alkyl salicylates, naphthenates and other oil soluble mono- and dicarboxylic acids. Highly basic (viz, overbased) metal sales, such as highly basic alkaline earth metal sulfonates (especially Ca and Mg salts) are frequently used as detergents.

Compositions when containing these conventional additives are typically blended into the base oil in amounts which are effective to provide their normal attendant function. Thus, typical formulations can include, in amounts by weight, a VI improver (0.01-12%); a corrosion inhibitor (0.01-5%); an oxidation inhibitor (0.01-5%); depressant (0.01-5%); an anti-foaming agent (0.001-3%); an anti-wear agent (0.001-5%); a friction modifier (0.01-5%); a detergent/rust inhibitor (0.01-10%); and a base oil.

When other additives are used, it may be desirable, although not necessary, to prepare additive concentrates comprising concentrated solutions or dispersions of the viscosity index improver (in concentrate amounts hereinabove described), together with one or more of the other additives, such a concentrate denoted an "additive package," whereby several additives can be added simultaneously to the base oil to form a lubricating oil composition. Dissolution of the additive concentrate into the lubricating oil may be facilitated by solvents and by mixing accompanied with mild heating, but this is not essential. The additive-package will typically be formulated to contain the viscosity index improver and optional additional additives in proper amounts to provide the desired concentration in the final formulation when the additive-package is combined with a predetermined amount of base lubricant. Thus, the products of the present invention can be added to small amounts of base oil or other compatible solvents along with other desirable additives to form additive-packages containing active ingredients in collective amounts of typically from 2.5 wt. % to 90 wt. %, preferably from 5 wt. % to 75 wt. %, and still more preferably from 8 wt. % to 50 wt. % additives in the appropriate proportions with the remainder being base oil. The final formulations may use typically about 10 wt. % of the additive-package with the remainder being base oil.

In at least one specific embodiment, the lubricating oil composition can include: one or more ethylene-propylene copolymers in an amount of from 0.1 wt. % to 20 wt. %; one or more base oils in an amount of from 1 wt. % to 99 wt. %; one or more dispersants in an amount of from 0.01 wt. % to 25 wt. %; and optionally one or more other additives in an amount of from 0.01 wt. % to 20 wt. %, based on total weight of the lubricating oil composition. The amount of the ethylene-propylene copolymer can also range from a low of about 0.1 wt. %, 0.5 wt. %, 1 wt. %, 2 wt. % to a high of about 10 wt. %, 15 wt. %, 18 wt. %, or 20 wt. %. In at least one specific embodiment, the one or more base oils can be present in an amount of from 1 wt. % to 99 wt. %; or 50 wt. % to 99 wt. %; or 53 wt. % to 90 wt. %; or 60 wt. % to 90 wt. %. In at least one specific embodiment, the one or more dispersants can be present in an amount of from 0.5 wt. % to 20 wt. %; or 1.0 wt. % to 18 wt. %; or 3.0 wt. % to 15 wt. %; or 5 wt. % to 14 wt. %; or 5.0 wt. % to 10 wt. %. In at least one specific embodiment, the one or more additives, when present, can range of from 0.05 wt. % to 10 wt. %; or 0.7 wt. % to 5 wt. %; or 0.75 wt. % to 5 wt. %; or 0.5 wt. % to 3 wt. %; or 0.75 wt. % to 3 wt. %. Such weight percentages are based on the total weight of the oil composition.

EXAMPLES

The foregoing discussion can be further described with reference to the following non-limiting examples. Examples 1-14 are ethylene-propylene copolymers according to one or more embodiments provided herein. The inventive examples were prepared using either a "C1/A1" or "C2/A2" catalyst system where "C1" was dimethylsilylene(tetramethylcyclopentadienyl) (cyclododecylamido)titanium dimethyl; "A1" was N,N-dimethylanilinium tetrakis(perfluorophenyl)borate; "C2" was di(p-triethylsilylphenyl)methylene [(cyclopentadienyl)(2,7-di-tert-butylfluoren-9-yl)]hafnium dimethyl; and "A2" was N,N-dimethylanilinium tetrakis(perfluoronaphthyl)borate. The comparative examples 1-13 were prepared using a C2/A1 catalyst system.

Tables 1-3 show the bulk viscosity data of the inventive and comparative polymers. Table 4 shows the thickening efficiency and shear stability index along with MFR and ethylene content for some of the inventive and comparative polymers.
Increased Shear Thinning The inventive polymers showed increased shear thinning as evidenced by the ratio of the melt flow rate at 21.6 kg; 230° C. to the melt flow rate at 2.16 kg; 230° C. (MFRR) while maintaining a narrow molecular weight distribution (Table 1). The MFRR of the inventive polymers is generally about 10 units higher than the MFRR of the comparative polymers.

TABLE 1

| Example | Catalyst | MFR | HLMFR | MFRR | Mn (DRI) | Mw (DRI) | Mz (DRI) | Mw (LS) | Mw/Mn | Mz/Mw |
|---|---|---|---|---|---|---|---|---|---|---|
| Inventive 1 | C1/A1 | 2.1 | 100.9 | 49.0 | 50,259 | 109,555 | 201,489 | 114,665 | 2.18 | 1.84 |
| Inventive 2 | C1/A1 | 4.7 | 204.4 | 43.1 | 43,974 | 92,036 | 160,110 | 98,898 | 2.09 | 1.74 |
| Inventive 3 | C1/A1 | 3.6 | 155.9 | 45.3 | 46,902 | 101,946 | 190,067 | 105,073 | 2.17 | 1.86 |
| Inventive 4 | C1/A1 | 9.5 | no data | no data | 39,323 | 83,550 | 149,594 | 88,937 | 2.12 | 1.79 |
| Inventive 5 | C1/A1 | 8.9 | 342.0 | 40.2 | 38,798 | 82,177 | 145,886 | 87,452 | 2.12 | 1.78 |
| Inventive 6 | C1/A1 | 23.5 | no data | no data | 32,589 | 70,498 | 131,759 | 73,218 | 2.16 | 1.87 |
| Inventive 7 | C1/A1 | 8.3 | 309.6 | 38.4 | 39,657 | 84,146 | 146,323 | 88,804 | 2.12 | 1.74 |
| Inventive 8 | C2/A2 | 8.47 | 338.73 | 40.0 | 35,946 | 85,405 | 166,492 | 86,998 | 2.38 | 1.95 |
| Inventive 9 | C2/A2 | 9.04 | 370.97 | 41.0 | 33,463 | 82,848 | 163,640 | 85,896 | 2.48 | 1.98 |
| Inventive 10 | C2/A2 | 5.92 | 270.2 | 45.6 | 37,846 | 90,324 | 178,137 | 94,329 | 2.39 | 1.97 |
| Inventive 11 | C2/A2 | 9.72 | 409.27 | 42.1 | 34,708 | 83,536 | 163,369 | 87,376 | 2.41 | 1.96 |
| Inventive 12 | C2/A2 | 17.38 | no data | no data | 29,893 | 75,544 | 153,239 | 75,127 | 2.53 | 2.03 |
| Inventive 13 | C2/A2 | 8.8 | 379.55 | 43.1 | 35,448 | 81,571 | 154,515 | 85,700 | 2.30 | 1.89 |
| Inventive 14 | C2/A2 | 6.76 | 289.49 | 42.8 | 33,736 | 85533 | 168,054 | 86,859 | 2.54 | 1.96 |
| Comp. 1 | C2/A1 | 6.3 | 189.6 | 30.0 | 43,614 | 95,081 | 165,165 | 94,307 | 2.18 | 1.74 |

TABLE 1-continued

| Example | Catalyst | MFR | HLMFR | MFRR | Mn (DRI) | Mw (DRI) | Mz (DRI) | Mw (LS) | Mw/Mn | Mz/Mw |
|---|---|---|---|---|---|---|---|---|---|---|
| Comp. 2 | C2/A1 | 5.3 | 167.3 | 31.7 | 44,561 | 97,691 | 168,600 | 98,237 | 2.19 | 1.73 |
| Comp. 3 | C2/A1 | 5.3 | 174.5 | 32.7 | 43,401 | 96,912 | 168,486 | 95,625 | 2.23 | 1.74 |
| Comp. 4 | C2/A1 | 6.5 | 202.6 | 31.3 | 43,174 | 93,660 | 162,492 | 92,798 | 2.17 | 1.73 |
| Comp. 5 | C2/A1 | 7.4 | 254.3 | 34.5 | 43,319 | 93,742 | 163,884 | 92,840 | 2.16 | 1.75 |
| Comp. 6 | C2/A1 | 6.8 | 219.6 | 32.2 | 39,384 | 95,150 | 177,004 | 93,193 | 2.42 | 1.86 |
| Comp. 7 | C2/A1 | 5.7 | 193.9 | 34.2 | 44,267 | 96,126 | 167,390 | 95,771 | 2.17 | 1.74 |
| Comp. 8 | C2/A1 | 6.2 | 198.0 | 32.1 | 45,582 | 93,094 | 161,402 | 92,366 | 2.04 | 1.73 |
| Comp. 9 | C2/A1 | 5.9 | 191.4 | 32.3 | 43,483 | 96,068 | 166,375 | 95,479 | 2.21 | 1.73 |
| Comp. 10 | C2/A1 | 6.2 | 202.9 | 32.9 | 41,648 | 92,713 | 159,550 | 91,725 | 2.23 | 1.72 |
| Comp. 11 | C2/A1 | 5.0 | 165.0 | 33.0 | 46,547 | 99,906 | 159,550 | 99,212 | 2.15 | 1.60 |
| Comp. 12 | C2/A1 | 6.8 | 216.1 | 31.8 | 42,301 | 93,983 | 163,626 | 92,699 | 2.22 | 1.74 |
| Comp. 13 | C2/A1 | 6.2 | 206.4 | 33.1 | no data | no data | no data | no data | no data | no data |

Table 2 shows the oscillatory shear viscosity (eta*) at a shear rate of 0.01 rad/sec measured at 50° C., 70° C., 90° C., and 110° C. The inventive polymers have higher viscosity despite having a higher MFR suggesting lower tendency to cold flow and easier finishing (at room temperature).

TABLE 2

| Example | MFR | eta * at 50° C. | eta * at 70° C. | eta * at 90° C. | eta * at 110° C. |
|---|---|---|---|---|---|
| Inventive 1 | 2.06 | 1,740,000 | 917,000 | 469,000 | 240,000 |
| Inventive 2 | 4.73 | 1,280,000 | 577,000 | 259,000 | 53,200 |
| Inventive 3 | 3.63 | 1,550,000 | 791,000 | 378,000 | 170,000 |
| Inventive 4 | 9.51 | 794,000 | 315,000 | 126,000 | 50,600 |
| Inventive 5 | 8.9 | 795,000 | 324,000 | 132,000 | 51,900 |
| Inventive 6 | 23.49 | 349,000 | 157,000 | 30,700 | 24,000 |
| Comparative 8 | 6.2 | 372,000 | 276,000 | 66,200 | 24,200 |
| Comparative 11 | 5.0 | 690,000 | 311,000 | 115,000 | 60,900 |

Table 3 shows the TE and SSI data for inventive polymers 1-10 and comparative polymers 6, 8, 9, and 11 that were used to make a lubricating oil composition. To measure TE/SSI, 6 grams of polymer, 0.09 g Irganox 1076 and 0.03 g Irgafos 168 was dissolved in 593.88 g of AC-150 base oil.

TABLE 3

| Example | MFR | Ethylene wt. % | TE | SSI (30 passes) | SSI (90 passes) |
|---|---|---|---|---|---|
| Inventive 1 | 2.06 | 44.38 | 2.19 | 33.95 | |
| Inventive 2 | 4.73 | 44.19 | 1.92 | 27.29 | |
| Inventive 3 | 3.63 | 44.25 | 2.02 | 30.79 | |
| Inventive 4 | 9.51 | 43.55 | 1.75 | 22.91 | |
| Inventive 5 | 8.9 | 43.99 | 1.82 | 23.51 | |
| Inventive 6 | 23.49 | 44.52 | 1.72 | 20.33 | |
| Inventive 7 | 8.26 | 45.66 | 1.86 | 24.25 | |
| Inventive 8 | 8.47 | 45.55 | 1.78 | 23 | 26.4 |
| Inventive 9 | 9.04 | 45.49 | 1.75 | 21.2 | 24.2 |
| Inventive 10 | 5.92 | 44.79 | 1.75 | 19.8 | 22.8 |
| Comparative 6 | 6.8 | 44.7 | 1.86 | 29.30 | |
| Comparative 8 | 6.2 | 45.7 | 1.88 | 28.10 | |
| Comparative 9 | 5.9 | 45.3 | 1.89 | 28.85 | |
| Comparative 11 | 5.0 | 44.6 | 1.93 | 30.85 | |

Thickening efficiency was determined according to ASTM D445.

Shear stability index was determined according to ASTM D6278.

Polymerization Examples (HTCPU)

The polymers for inventive examples 1-7 were made in one continuous stirred tank reactor using the catalyst system C1/A1. The polymerization was performed in solution, using hexane as a solvent and at a reaction temperature shown in Table 4. Ethylene and propylene feed rates are also listed in Table 4. In the process, temperature control was used to achieve the desired MFR. The catalyst, activated externally to the reactor, was added as needed in amounts effective to maintain the target polymerization temperature.

The catalyst and activator were dissolved in toluene so that the metallocene concentration was $1.14*10^{-4}$ mole/liter and the activator concentration was $1.11*10^{-4}$ mole/liter to achieve a catalyst/activator ratio of 1.03. Tri n-octyl aluminum (TNOA) was dissolved in isohexane at 25 wt. % and fed into the reactor as a scavenger. The feed rate of TNOA is listed in Table 4. The copolymer solution emerging from the reactor was stopped from further polymerization by addition of water and then devolatilized using conventionally known devolatilization methods such as flashing or liquid phase separation, first by removing the bulk of the isohexane to provide a concentrated solution, and then by stripping the remainder of the solvent in anhydrous conditions. Table 4 summarizes the reaction parameters.

TABLE 4

| Example | Cat/Activator | % C2 | MFR (g/10 min) | Catalyst feed rate (g/h) | C2 feed rate (g/h) | C3 feed rate (g/h) | TNOA feed rate (g/h) | Solvent Rate (g/h) | Cat Eff (g/g) | Rx Temp (C.) |
|---|---|---|---|---|---|---|---|---|---|---|
| Inventive 1 | C1/A1 | 44.38 | 2.06 | 0.012 | 118.2 | 199.26 | 0.12 | 3564 | 16301.1 | 105 |
| Inventive 2 | C1/A1 | 44.19 | 4.73 | 0.012 | 118.2 | 199.8 | 0.12 | 3564 | 16703.9 | 110 |
| Inventive 3 | C1/A1 | 44.25 | 3.63 | 0.012 | 118.2 | 203.04 | 0.12 | 3564 | 16896.1 | 107 |
| Inventive 4 | C1/A1 | 43.55 | 9.51 | 0.012 | 118.2 | 203.472 | 0.12 | 3564 | 16851.6 | 112 |
| Inventive 5 | C1/A1 | 43.99 | 8.9 | 0.012 | 118.2 | 203.472 | 0.12 | 3564 | 16722.6 | 114 |

TABLE 4-continued

| Example | Cat/Activator | % C2 | MFR (g/10 min) | Catalyst feed rate (g/h) | C2 feed rate (g/h) | C3 feed rate (g/h) | TNOA feed rate (g/h) | Solvent Rate (g/h) | Cat Eff (g/g) | Rx Temp (C.) |
|---|---|---|---|---|---|---|---|---|---|---|
| Inventive 6 | C1/A1 | 44.52 | 23.49 | 0.012 | 118.2 | 200.88 | 0.12 | 3564 | 15761.3 | 116 |
| Inventive 7 | C1/A1 | 45.66 | 8.26 | 0.012 | 118.2 | 202.5 | 0.12 | 3564 | 15298.5 | 118 |

Polymerization Examples (mCPU)

The polymers of inventive examples 8-14 were made in one continuous stirred tank reactor using the catalyst system C2/A2. The polymerization was performed in solution, using isohexane as a solvent and at the reaction temperatures shown in Table 5. The catalyst and activator were dissolved in toluene so that the metallocene concentration was 0.1156 wt. % and the activator concentration was 0.1359 wt. % to achieve a catalyst/activator ratio of 1:1. Tri n-octyl aluminum (TNOA) was dissolved in isohexane at 3 wt. % and fed into the reactor as a scavenger. The feed rate of the scavenger is listed in Table 5. The overall pressure in the reactor was 1,600 psi (11.03 MPa) and ethylene and propylene feed rates are listed in Table 5. In the process, hydrogen addition and temperature control was used to achieve the desired MFR. The catalyst, activated externally to the reactor, was added as needed in amounts effective to maintain the target polymerization temperature. The copolymer solution emerging from the reactor was stopped from further polymerization by addition of water and then devolatilized using conventionally known devolatilization methods such as flashing or liquid phase separation, first by removing the bulk of the isohexane to provide a concentrated solution, and then by stripping the remainder of the solvent in anhydrous conditions using a develoatilizing unit so as to end up with a molten polymer composition. The molten polymer was discharged using a single screw extruder connected to a gear pump and pelletized in an underwater pelletizer fed with chilled water. Table 5 summarizes the reaction parameters.

TABLE 5

| EX. | Catalyst | Rx T (° C.) | Cat Feed Rate (cc/min) | Solvent Feed Rate (kg/hr) | C2 Feed Rate (kg/hr) | C3 Feed Rate (kg/hr) | H2 Feed Rate (sccm) | TNOA feed rate (kg/hr) | Polymerization rate (kg/hr) | C2 Content (wt. %) | MFR (230° C., 2.16 kg) g/10 min |
|---|---|---|---|---|---|---|---|---|---|---|---|
| 8 | C2/A2 | 137.7 | 0.7 | 35.36 | 3.85 | 6.53 | 8.66 | 0.015 | 6.45 | 45.55 | 8.47 |
| 9 | C2/A2 | 137.7 | 0.54 | 35.32 | 3.86 | 6.53 | 8.24 | 0.015 | 6.42 | 45.49 | 9.04 |
| 10 | C2/A2 | 132.8 | 0.96 | 35.39 | 3.46 | 5.58 | 8.1 | 0.015 | 5.96 | 44.79 | 5.92 |
| 11 | C2/A2 | 132.7 | 1.07 | 35.32 | 3.35 | 5.24 | 8.35 | 0.015 | 5.91 | 44.61 | 9.72 |
| 12 | C2/A2 | 135.8 | 1.75 | 35.28 | 3.5 | 5.48 | 7.73 | 0.015 | 6.10 | 45.04 | 17.38 |
| 13 | C2/A2 | 134.2 | 2.19 | 35.22 | 3.59 | 5.62 | 8.34 | 0.015 | 6.07 | 45.93 | 8.8 |
| 14 | C2/A2 | 133.8 | 1.69 | 35.35 | 3.58 | 5.61 | 8.1 | 0.015 | 6.04 | 46.43 | 6.76 |

TABLE 6

Lube oil compositions

| Formulation | | Comp. EX. X11 | Example X12 | Example X13 | Example X14 |
|---|---|---|---|---|---|
| EHC 45 (4.6 Cst) | BS Gp II+ | 53 | 52 | 52 | 52 |
| EHC 60 (6.1 Cst) | BS Gp II+ | 31 | 30.6 | 30.6 | 30.6 |
| Inventive Polymer 8 | mEPR | | 1.4 | | |
| Inventive Polymer 9 | mEPR | | | 1.4 | |
| Inventive Polymer 10 | mEPR | | | | 1.4 |
| Infineum D3426 | Addpkg | 14 | 14 | 14 | 14 |
| Infineum 9340 (400BN) | Mg Sulfonate | 0.7 | 0.7 | 0.7 | 0.7 |
| Infineum 9330 (300BN) | Ca Sulfonate | 1 | 1 | 1 | 1 |
| Infineum V387 | PPD | 0.3 | 0.3 | 0.3 | 0.3 |

EHC 45 and EHC 60 are Group II base oils available from Imperial Oil, Canada.
Infineum D3426 is an engine oil additive package.
Infineum 9340 (400BN) is a Mg sulfonate additive.
Infineum 9330 (300BN) is a Ca sulfonate additive.
Infineum V387 is a pour point depressant.

TABLE 7

Basic properties of lubricating oil compositions of the inventive polymers at the concentrations shown in Table 6.

| | | Method | Comp EX X11 | Example X12 | Example X13 | Example X14 |
|---|---|---|---|---|---|---|
| | KV 100 (cSt) | D445-5 (30 mL) | 8.101 | 16.8 | 16.88 | 16.77 |
| 15W-50 | CCS @-20 C (cP) | D5293-4 (60 mL) | 2460 | 3590 | 3570 | 3580 |
| 15W-50 | MRV @-25° C. (yield stress) | D4684-4 (30 mL) | <35 | <35 | <35 | <35 |
| 15W-50 | MRV @-25° C. visc. (cP) | D4684-4 (30 mL) | 8200 | 16,600 | 16,300 | 16,600 |
| 10W-50 | MRV @-30° C. (yield stress) | D4684-5 (30 mL) | <35 | <35 | <35 | <35 |
| 10W-50 | MRV @-30° C. visc. (cP) | D4684-5 (30 mL) | 18100* | 43,700 | 43,100 | 42,100 |
| | Pour Point | D5949-31 (2 mL) | −45 C. | −41 C. | −44 C. | −41 C. |

Cold cranking simulator (CCS) tests were performed at −20° C. per ASTM D5293.

Mini rotary viscometer (MRV) tests were performed at −30° C. per ASTM D4684.

Pour point was determined according to ASTM D97.

Certain embodiments further relate to:

1. An amorphous ethylene propylene copolymer, comprising:
   of from about 40 wt. % to about 60 wt. % ethylene derived units; and
   of from about 60 wt. % to about 40 wt. % propylene derived units, wherein the copolymer is characterized by having:
   no discernable melting point as measured by DSC;
   an MFRR (MI (21.6 kg; 230° C.)/MI (2.16 kg; 230° C.)) of about 38 or more;
   a molecular weight distribution (MWD) of from about 1.5 to about 2.5; and
   a shear viscosity $\eta^*$ at 0.01 rad/sec measured at 70° C. that satisfies the relation $|\eta^*|_{(70° C.; 0.01\ rad/sec)} > 1.2*10^6*|MFR|^{-0.77}$, wherein MFR is the melt flow rate.

2. The copolymer of paragraph 1, wherein the MWD is of from about 2.0 to about 2.4.

3. The copolymer of paragraphs 1 or 2, wherein the MWD is of from about 2.1 to about 2.3.

4. The copolymer according to any preceding paragraph 1 to 3, wherein the shear viscosity $\eta^*$ at 0.01 rad/sec measured at 70° C. that satisfies the relation $|\eta^*|_{(70° C.; 0.01\ rad/sec)} > 1.6*10^6*|MFR|^{-0.77}$, wherein MFR is the melt flow rate.

5. The copolymer according to any preceding paragraph 1 to 4, wherein the shear viscosity $\eta^*$ at 0.01 rad/sec measured at 70° C. that satisfies the relation $|\eta^*|_{(70° C.; 0.01\ rad/sec)} > 1.8*10^6*|MFR|^{-0.77}$, wherein MFR is the melt flow rate.

6. The copolymer according to any preceding paragraph 1 to 5, wherein the MWD is about 2.2.

7. The copolymer according to any preceding paragraph 1 to 6, wherein the MWD is about 2.5.

8. The copolymer according to any preceding paragraph 1 to 7, further comprising a MFR of from about 2 g/10 min to about 25 g/10 min.

9. The copolymer according to any preceding paragraph 1 to 8, further comprising a MFR of from about 6 g/10 min to about 10 g/10 min.

10. The copolymer according to any preceding paragraph 1 to 9, wherein the ethylene derived units are present in an amount of from about 40 wt. % to about 50 wt. %, and the propylene derived units are present in an amount of from about 45 wt. % to about 60 wt. %.

11. The copolymer according to any preceding paragraph 1 to 10, wherein the ethylene derived units are present in an amount of from about 42 wt. % to about 50 wt. %, and the propylene derived units are present in an amount of from about 50 wt. % to about 48 wt. %.

12. An oil composition, comprising:
   a base oil; and
   an amorphous ethylene propylene copolymer comprising of from about 40 wt. % to about 60 wt. % ethylene derived units, and of from about 60 wt. % to about 40 wt. % propylene derived units, wherein the copolymer is characterized by having:
   no discernable melting point as measured by DSC;
   an MFRR (MI (21.6 kg; 230° C.)/(MI (2.16 kg; 230° C.)) of about 38 or more;
   a molecular weight distribution (MWD) of from about 1.5 to about 2.5; and
   a shear viscosity $\eta^*$ at 0.01 rad/sec measured at 70° C. that satisfies the relation $|\eta^*|_{(70° C.; 0.01\ rad/sec)} > 1.2*10^6*|MFR|^{-0.77}$, wherein MFR is the melt flow rate.
   wherein the amorphous ethylene propylene copolymer is present in an amount sufficient to provide an oil composition having a thickening efficiency of about 1.7 to about 2.2; and a SSI of about 15% to about 35%.

13. The oil composition of paragraph 12, wherein the SSI is from about 21% to about 27%.

14. The oil composition of paragraphs 12 or 13, wherein SSI and MFR satisfy the following relation: $|SSI| < 50|MFR|^{-0.2242}$.

15. The oil composition according to any preceding paragraph 12 to 14, wherein SSI and MFR satisfy the following relation: $|SSI| < 45|MFR|^{-0.2242}$.

16. The oil composition according to any preceding paragraph 12 to 15, wherein SSI and MFR satisfy the following relation: $|SSI| < 42|MFR|^{-0.2242}$.

17. The oil composition according to any preceding paragraph 12 to 16, wherein the copolymer has a MWD is of from about 2.0 to about 2.4.

18. The oil composition according to any preceding paragraph 12 to 17, wherein the copolymer has a shear viscosity $\eta^*$ at 0.01 rad/sec measured at 70° C. that satisfies the following relation $|\eta^*|_{(70° C.; 0.01\ rad/sec)} > 1.6*10^6*|MFR|^{-0.77}$, wherein MFR is the melt flow rate.

19. The oil composition according to any preceding paragraph 12 to 18, wherein the copolymer has a shear viscosity $\eta^*$ at 0.01 rad/sec measured at 70° C. that satisfies the following relation $|\eta^*|_{(70°\ C.;\ 0.01\ rad/sec)} > 1.8*10^6 * |MFR|^{-0.77}$, wherein MFR is the melt flow rate.

20. The oil composition according to any preceding paragraph 12 to 19, wherein the copolymer has a MFR of from about 2 g/10 min to about 25 g/10 min.

21. The oil composition according to any preceding paragraph 12 to 20, wherein the copolymer has a MFR of from about 6 g/10 min to about 10 g/10 min.

22. The oil composition according to any preceding paragraph 12 to 21, wherein the copolymer comprises from about 40 wt. % to about 50 wt. % ethylene derived units and from about 60 wt. % to about 50 wt. % propylene derived units.

23. The oil composition according to any preceding paragraph 12 to 22, wherein the thickening efficiency is about 1.7 to about 2.0.

24. A method for making an amorphous ethylene propylene copolymer, comprising:
reacting ethylene and propylene in the presence of dimethylsilylene (tetramethyl cyclopentadienyl) (cyclododecylamido) titanium dimethyl or di(p-triethylsilylphenyl) methylene [(cyclopentadienyl) (2,7-di-tert-butylfluoren-9-yl)] hafnium dimethyl at conditions sufficient to produce an amorphous copolymer comprising of from about 40 wt. % to about 60 wt. % ethylene derived units and from about 60 wt. % to about 40 wt. % propylene derived units and is characterized by having:
no discernable melting point as measured by DSC;
an MFRR (MI (21.6 kg; 230° C.)/(MI (2.16 kg; 230° C.)) of about 38 or more;
a molecular weight distribution (MWD) of from about 1.5 to about 2.5; and
a shear viscosity $\eta^*$ at 0.01 rad/sec measured at 70° C. that satisfies the relation $|\eta^*|_{(70°\ C.;\ 0.01\ rad/sec)} > 1.2*10^6 * |MFR|^{-0.77}$, wherein MFR is the melt flow rate 25. A method for making a lubricating oil, comprising:
reacting ethylene and propylene in the presence of dimethylsilylene (tetramethyl cyclopentadienyl) (cyclododecylamido) titanium dimethyl or di(p-triethylsilylphenyl) methylene [(cyclopentadienyl) (2,7-di-tert-butylfluoren-9-yl)] hafnium dimethyl at conditions sufficient to produce an amorphous copolymer comprising of from about 40 wt. % to about 60 wt. % ethylene derived units and from about 60 wt. % to about 40 wt. % propylene derived units and is characterized by having:
no discernable melting point as measured by DSC;
an MFRR (MI (21.6 kg; 230° C.)/(MI (2.16 kg; 230° C.)) of about 38 or more;
a molecular weight distribution (MWD) of from about 1.5 to about 2.5; and
a shear viscosity $\eta^*$ at 0.01 rad/sec measured at 70° C. that satisfies the relation $|\eta^*|_{(70°\ C.;\ 0.01\ rad/sec)} > 1.2*10^6 * |MFR|^{-0.77}$, wherein MFR is the melt flow rate; and
blending the amorphous copolymer with a base oil.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. An amorphous ethylene propylene copolymer, comprising:
from about 40 wt % to about 60 wt % of ethylene derived units; and
from about 60 wt % to about 40 wt % of propylene derived units, wherein the copolymer is characterized by having:
no discernible melting point as measured by DSC;
an MFRR (MI (21.6 kg; 230° C.)/MI (2.16 kg; 230° C.)) of about 38 or more;
a molecular weight distribution (MWD) of from about 1.5 to about 2.5; and
a shear viscosity $\eta^*$ at 0.01 rad/sec measured at 70° C. that satisfies the relation $|\eta^*|_{(70°\ C.;\ 0.01\ rad/sec)} > 1.2*10^6 * |MFR|^{-0.77}$, wherein MFR is the melt flow rate.

2. The copolymer of claim 1, wherein the MWD is from about 2.0 to about 2.4.

3. The copolymer of claim 1, wherein the MWD is from about 2.1 to about 2.3.

4. The copolymer of claim 1, wherein the shear viscosity $\eta^*$ at 0.01 rad/sec measured at 70° C. that satisfies the relation $|\eta^*|_{(70°\ C.;\ 0.01\ rad/sec)} > 1.6*10^6 * |MFR|^{-0.77}$, wherein MFR is the melt flow rate.

5. The copolymer of claim 1, wherein the shear viscosity $\eta^*$ at 0.01 rad/sec measured at 70° C. that satisfies the relation $|\eta^*|_{(70°\ C.;\ 0.01\ rad/sec)} > 1.8*10^6 * |MFR|^{-0.77}$, wherein MFR is the melt flow rate.

6. The copolymer of claim 5, wherein the MWD is about 2.2.

7. The copolymer of claim 5, wherein the MWD is about 2.5.

8. The copolymer of claim 5, further comprising a MFR of from about 2 g/10 min to about 25 g/10 min.

9. The copolymer of claim 5, further comprising a MFR of from about 6 g/10 min to about 10 g/10 min.

10. The copolymer of claim 8, wherein the ethylene derived units are present in an amount of from about 40 wt % to about 50 wt %, and the propylene derived units are present in an amount of from about 45 wt % to about 60 wt %.

11. The copolymer of claim 8, wherein the ethylene derived units are present in an amount of from about 42 wt % to about 50 wt %, and the propylene derived units are present in an amount of from about 50 wt % to about 48 wt %.

12. A method for making an amorphous ethylene propylene copolymer, comprising:
reacting ethylene and propylene in the presence of dimethylsilylene (tetramethyl cyclopentadienyl) (cyclododecylamido) titanium dimethyl or di(p-triethylsilylphenyl) methylene [(cyclopentadienyl) (2,7-di-tert-butylfluoren-9-yl)]hafnium dimethyl at conditions sufficient to produce an amorphous copolymer comprising of from about 40 wt % to about 60 wt % ethylene derived units and from about 60 wt % to about 40 wt % propylene derived units and is characterized by having:

no discernible melting point as measured by DSC;

an MFRR (MI (21.6 kg; 230° C.)/MI (2.16 kg; 230° C.)) of about 38 or more;

a molecular weight distribution (MWD) of from about 1.5 to about 2.5; and a shear viscosity $\eta^*$ at 0.01 rad/sec measured at 70° C. that satisfies the relation $|\eta^*|_{(70° C.; 0.01\ rad/sec)} > 1.2*10^6*|MFR|^{-0.77}$, wherein MFR is the melt flow rate.

13. The method of claim 12, wherein the MWD is from about 2.0 to about 2.4.

14. The method of claim 12, wherein the shear viscosity $\eta^*$ at 0.01 rad/sec measured at 70° C. satisfies the relation $|\eta^*|_{(70° C.; 0.01\ rad/sec)} > 1.6*10^6*|MFR|^{-0.77}$.

15. The method of claim 12, wherein the shear viscosity $\eta^*$ at 0.01 rad/sec measured at 70° C. satisfies the relation $|\eta^*|_{(70° C.; 0.01\ rad/sec)} > 1.8*10^6*|MFR|^{-0.77}$.

16. The method of claim 15, wherein the MWD is about 2.2.

17. The method of claim 15, wherein the MWD is about 2.5.

18. The method of claim 15, wherein the MFR is about 2 g/10 min to about 25 g/10 min.

19. The method of claim 15, wherein the MFR is about 6 g/10 min to about 10 g/10 min.

20. The method of claim 15, wherein the amorphous copolymer comprises about 40 wt % to about 50 wt % of the ethylene derived units, and about 45 wt % to about 60 wt % of the propylene derived units.

* * * * *